(12) United States Patent
Mishra et al.

(10) Patent No.: US 10,541,889 B1
(45) Date of Patent: Jan. 21, 2020

(54) OPTIMIZATION MECHANISM FOR THRESHOLD NOTIFICATIONS IN SERVICE OAM FOR PERFORMANCE MONITORING

(71) Applicant: Juniper Networks, Inc., Sunnyvale, CA (US)

(72) Inventors: Praveer Mishra, Bangalore (IN); Shrikant A. Metri, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 495 days.

(21) Appl. No.: 14/501,408

(22) Filed: Sep. 30, 2014

(51) Int. Cl.
*G06F 15/16* (2006.01)
*H04L 12/26* (2006.01)

(52) U.S. Cl.
CPC .......... *H04L 43/04* (2013.01); *H04L 43/0876* (2013.01)

(58) Field of Classification Search
CPC ..................................................... H04L 43/04
USPC ........................................................ 709/224
See application file for complete search history.

(56) References Cited

U.S. PATENT DOCUMENTS

| | | | | |
|---|---|---|---|---|
| 6,070,190 A * | 5/2000 | Reps | ................... | G06F 11/3495 709/203 |
| 6,175,832 B1 * | 1/2001 | Luzzi | ..................... | H04L 63/12 |
| 6,397,359 B1 * | 5/2002 | Chandra | ............. | H04L 41/5009 709/224 |
| 7,668,953 B1 * | 2/2010 | Sinclair | ................ | H04L 41/064 709/224 |
| 7,756,025 B1 * | 7/2010 | Grills | .................... | H04L 1/0017 370/230 |
| 2003/0009540 A1 * | 1/2003 | Benfield | ............. | H04L 41/0213 709/220 |
| 2008/0049745 A1 * | 2/2008 | Edwards | ............... | H04M 15/00 370/389 |

(Continued)

OTHER PUBLICATIONS

Harrington et al. "An Architecture for Describing Simple Network Management Protocol (SNMP) Management Frameworks" Network Working Group, RFC 3411, Dec. 2002, 64 pgs.

(Continued)

*Primary Examiner* — Kevin T Bates
*Assistant Examiner* — Clarence D McCray
(74) *Attorney, Agent, or Firm* — Shumaker & Sieffert, P.A.

(57) ABSTRACT

An example device includes a network interface and a control unit that provides an execution environment for network performance monitoring module. The network performance monitoring monitors performance of a network between the network device and a different network device, determines, based on the monitoring, that the performance does not satisfy a performance metric, in response to the determination, performs enhanced network performance monitoring for a duration of time, and determines, based on the enhance network performance monitoring, a number of times the performance of the network transitioned between not satisfying the performance metric and satisfying the performance metric during the duration of time. The network interface transmits, to an element management system, information about the performance of the network, the information including at least the number of times the performance of the network transitioned between not satisfying and satisfying the performance metric during the duration of time.

18 Claims, 5 Drawing Sheets

(56) References Cited

U.S. PATENT DOCUMENTS

| | | | |
|---|---|---|---|
| 2008/0052387 A1* | 2/2008 | Heinz | H04L 41/5025 709/223 |
| 2008/0298248 A1* | 12/2008 | Roeck | H04L 47/10 370/237 |
| 2010/0061266 A1* | 3/2010 | Bugenhagen | H04L 43/00 370/253 |
| 2012/0243442 A1* | 9/2012 | Musku | H04L 12/4625 370/256 |
| 2014/0022901 A1* | 1/2014 | Suzuki | H04L 49/15 370/235 |
| 2014/0056126 A1* | 2/2014 | Bencheck | H04L 69/40 370/228 |

OTHER PUBLICATIONS

"Service OAM Requirements & Framework—Phase 1" Technical Specification, MEF 17, The Metro Ethernet Forum, Apr. 2007, 20 pgs.

"Service OAM Performance Monitoring Implementation Agreement" Implementation Agreement, MEF 35, The Metro Ethernet Forum, Apr. 2012, 89 pgs.

"Service OAM SNMP MIB for Performance Monitoring" Technical Specification, MEF 36, The Metro Ethernet Forum, Jan. 2012, 155 pgs.

* cited by examiner

OPTIMIZATION MECHANISM FOR THRESHOLD NOTIFICATIONS IN SERVICE OAM FOR PERFORMANCE MONITORING

TECHNICAL FIELD

This disclosure relates to computer networks and, more particularly, to techniques for monitoring network performance.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. A variety of intermediate devices operate to route the packets between the computing devices. For example, a computer network may include routers, switches, gateways, firewalls, and a variety of other devices to provide and facilitate network communication.

Often, in highly populated areas, the computer network includes links laid in the shape of a ring. When shaped in a ring, the network is referred to as a "ring network." A ring network in a highly populated area that implements a Layer Two (L2) Ethernet communications protocol may be referred to as a "metro Ethernet network." In a typical configuration, a metro Ethernet network includes a plurality of interconnected metro termination units (MTUs) that provide access to the metro Ethernet network for computing devices referred to as customer subscriber devices. The computing devices couple to the MTUs to gain access to the metro Ethernet network and thereby interconnect with other computing devices coupled to the metro Ethernet network.

The metro Ethernet network may implement Operations, Administration and Maintenance (OAM) protocols as well as the Simple Network Management Protocol (SNMP) for monitoring and managing the metro Ethernet network. The Simple Network Management Protocol (SNMP) is a standard defined by the Internet Engineering Task Force (IETF) for managing network devices. SNMP uses a design that incorporates one or more management information bases (MIBs) within a managed device to describe and expose internal data elements of the managed device.

The Metro Ethernet Forum (MEF) defines a performance monitoring MIB that is used to manage Service OAM implementations. When monitoring performance of a particular network device within the metro Ethernet network, the network device may be configured to send notifications to an element management system (EMS) in response to determining that certain performance parameters have not been met (e.g., that a performance threshold has been exceeded). Once the performance parameter drops below the threshold, the network device may notify the EMS that the performance parameter of the network device has once again been met.

SUMMARY

In general, techniques are described that enable a network device to detect multiple instances of threshold flapping over a time period and provide information about the threshold flapping to a network management system, where an instance of a threshold flap occurs when a value of a performance parameter of the network device crosses a threshold value and subsequently moves back across the threshold value. Typically, a network device may be configured to provide separate messages for each distinct instance that the value of the performance parameter moves back or forth across the performance threshold. In some instances, if the threshold flapping occurring within a short amount of time, the network device may be configured to limit the number of messages sent to the network management system, thus messages may not be sent for each instance of the threshold flapping. In contrast, a network device configured in accordance with techniques of this disclosure may determine that threshold has been traversed multiple times within a time period, regardless of how quickly the threshold flapping occurs, and, in response, provide the network management system information about every instance of threshold flapping that occurred during the time period.

Techniques of this disclosure may provide various advantages. For example, techniques described herein may enable the network device to detect threshold flapping and provide additional performance information to the network management system. By providing this additional performance information, the techniques of this disclosure may enable an administrator to have a better picture of the performance of a metro Ethernet network, which may enable the administrator to modify the configuration of the metro Ethernet network. In this manner, the amount of network bandwidth and the amount of management device resources used in response to device management system requests may be reduced.

In one embodiment, a method includes monitoring, by a first network device, performance of a network between the first network device and a second network device, and, responsive to determining, by the first network device, that the performance of the network does not satisfy a performance metric, performing, by the first network device and for a duration of time, enhanced network performance monitoring. The method may also include determining, with the first network device and based on the enhanced performance monitoring, a number of times the performance of the network transitioned between not satisfying the performance metric and satisfying the performance metric during the duration of time, and transmitting, from the first network device and to an element management system, information about the performance of the network, the information including at least the number of times the performance of the network transitioned between not satisfying the performance metric and satisfying the performance metric during the duration of time.

In another embodiment, network device includes a network interface, and a control unit that provides an execution environment for a network performance monitoring module. The network performance monitoring module is operable by the control unit to monitor performance of a network between the network device and a different network device, determine, based on the monitoring, that the performance does not satisfy a performance metric, responsive to the performance not satisfying the performance metric, perform enhanced network performance monitoring for a duration of time, and determine, based on the enhance network performance monitoring, a number of times the performance of the network transitioned between not satisfying the performance metric and satisfying the performance metric during the duration of time. The network interface transmits, to an element management system, information about the performance of the network, the information including at least the number of times the performance of the network transitioned between not satisfying the performance metric and satisfying the performance metric during the duration of time.

In another embodiment, a computer-readable storage medium is encoded with instructions that cause one or more programmable processors of a network device to monitor performance of a network between the first network device and a second network device, and, responsive to determining that the performance of the network does not satisfy a performance metric, perform, for a duration of time, enhanced network performance monitoring. The instructions may also cause the one or more programmable processors to determine, based on the enhanced performance monitoring, a number of times the performance of the network transitioned between not satisfying the performance metric and satisfying the performance metric during the duration of time, and transmit, to an element management system, information about the performance of the network, the information including at least the number of times the performance of the network transitioned between not satisfying the performance metric and satisfying the performance metric during the duration of time.

The details of one or more embodiments are set forth in the accompanying drawings and the description below. Other features, objects, and advantages will be apparent from the description and drawings, and from the claims.

DETAILED DESCRIPTION

Figure 1:
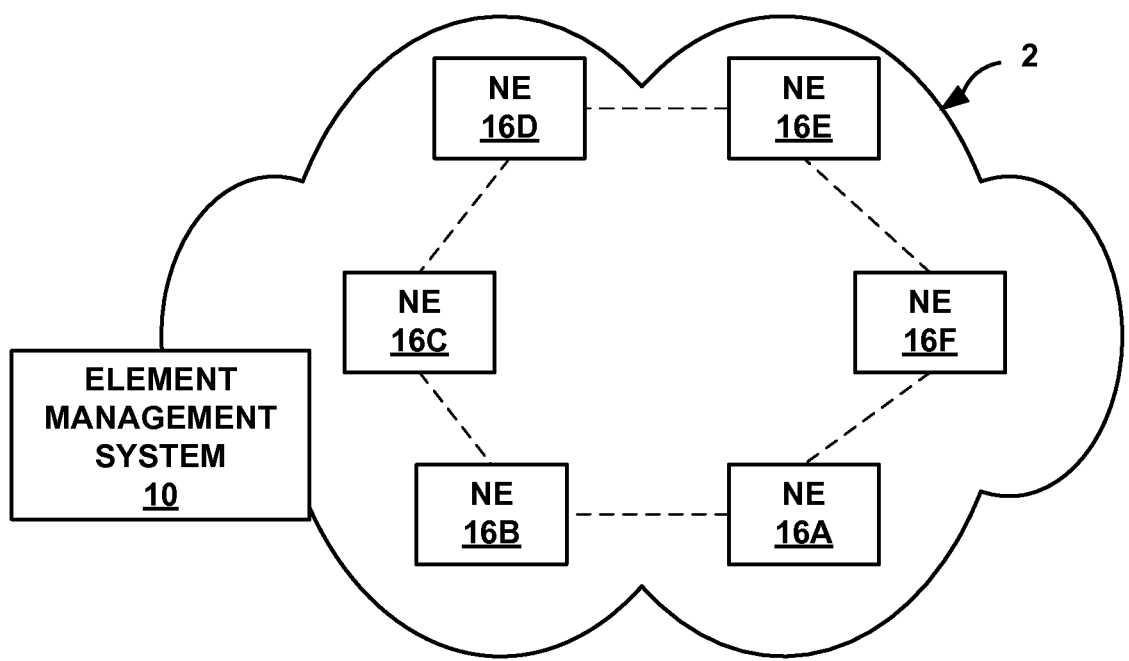
FIG. 1 is a block diagram illustrating elements of an example network that monitors performance of network elements and provides performance information to an element management system, in accordance with one or more aspects of this disclosure.

FIG. 1 is a block diagram illustrating elements of an example network 2 that monitors performance of network elements (NEs) 16A-16F (collectively, "network elements 16") and provides performance information to element management system 10, in accordance with one or more aspects of this disclosure. Even though one element management system 10 is illustrated in FIG. 1, any number of element management systems may be used to manage elements of network 2. Network elements 16 of network 2 include network devices interconnected via communication links to form a communication topology in order to exchange resources and information.

Network 2 may represent a metro Ethernet (ME) network and may support the transmission of data via layer two (L2) frames, e.g., Ethernet frames. Reference to "layers" followed by a number may refer to a particular layer of the Open Systems Interconnection (OSI) reference model. While described in this disclosure as transmitting, conveying, or otherwise supporting frames, network 2 may each data according to any other discrete data unit defined by any other protocol, such as a cell defined by the Asynchronous Transfer Mode (ATM) protocol, a packet-based protocol such as Transmission Control Protocol/Internet Protocol (TCP/IP), or a datagram defined by the User Datagram Protocol (UDP).

Element management system 10 is communicatively coupled to network elements 16 via network 2. Element management system 10 may be coupled either directly or indirectly to the various network elements 16. Once network elements 16 are deployed and activated, an administrator may use element management system 10 to manage network elements 16 using a management protocol designed for management of configuration data within network elements 16, such as the Simple Network Management Protocol (SNMP), or the Network Configuration (NETCONF) protocol, or a derivative thereof, to perform the configuration.

Network elements 16, while discussed herein with respect to a particular network device, e.g., a switch, may each represent any L2 network device that interfaces with a network, such as network 2, to switch, or otherwise forward network traffic directed to or originating from the network. For example, network elements 16 may each represent, in certain instances, one or more of a switch, a hub, a firewall, an IDP device, or any other type of L2 network equipment that facilitates the transfer of data within network 2.

In common practice, network elements 16 are managed by element management system 10. Multiple element management systems 10 may be centrally maintained and managed by a network management system (NMS). For purposes of simplicity, the term "element management system" will be used throughout this disclosure to refer to either or both element management systems and network management systems as the techniques described herein may be implemented using either or both such system. An administrator interacts with one or more element management systems 10 to remotely monitor and configure network elements 16. For example, the administrator may receive alerts from element management system 10 regarding any of network elements 16, view configuration data of network elements 16, modify the respective configuration data of network elements 16, add new network elements to network 2, remove existing network elements from network 2, or otherwise manipulate the network 2 and network elements therein.

The administrator may use element management system 10 to configure network elements 16, such as to specify certain operational characteristics that further the objectives of the administrator (e.g., improving performance of network 2). For example, the administrator may specify, for a network element 16, a particular operational policy regarding security, device accessibility, traffic engineering, quality of service (QoS), network address translation (NAT), packet filtering, packet forwarding, rate limiting, or other policies. Element management system 10 uses a network management protocol, such as SNMP, designed for management of configuration data within network devices or monitoring and retrieving operation data from network elements 16.

SNMP allows device element management system 10 to traverse and modify management information bases (MIBs) within each of network elements 16 that describe the structure of the management data of the device by using a namespace that contains object identifiers (OIDs). Each OID represents, within the particular network element 16, a managed object that identifies a specific characteristic about the network element. Managed objects include one or more object instances, also represented by an OID in a MIB, that each identifies a variable of management data (e.g., a operational/configuration parameter) within the network device that can be read or set by the client via SNMP. Further details regarding SNMP can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which is incorporated herein by reference.

To facilitate maintenance and configuration of network 2, one or more of network elements 16 may implement Operations, Administration, and Maintenance (OAM) techniques, such as Connectivity Fault Management (CFM) as described in the IEEE 802.1ag standard. CFM generally enables discovery and verification of a path, through network devices and networks, taken by data units, e.g., frames or packets, addressed to and from specified network users, e.g., network 2. Typically, CFM is directed to fault management within L2 networks, such as Ethernet networks, otherwise referred to as Large Area Networks (LANs), and L2 services, such as Virtual Private LAN Service (VPLS). While described herein with respect to L2 networks and services and CFM, the techniques may be employed to facilitate simultaneous execution of sessions for maintenance and operation management for networks and services provided with respect to other layers of the OSI reference model.

In accordance with CFM, one or more users or administrators of customer networks 14 may configure a Maintenance association End Point (MEP) within each one of network elements 16. Each of network elements 16 may be configured with one or more MEPs, one for each of a plurality of service instances. A MEP from one of network elements 16 (e.g., network element 16A) may establish a performance monitoring session with another MEP of a different one of network elements 16 (e.g., network element 16F). That is, network element 16A may monitor the performance of network 2 between network element 16A and network element 16F. Using the performance monitoring session, network element 16A may generate and send Ethernet frames to network element 16F. As network element 16A is generating the network traffic (i.e., the frames), which is sent to network element 16F, this network traffic may be referred to as "synthetic" traffic.

Network element 16F typically reflects the frames and sends them back to network element 16A. Network element 16A analyzes the frames and determines whether the performance of network 2 satisfies a performance metric. The performance metric may include one or more of frame loss and link delay. For example, network element 16A may determine how many frames were lost (i.e., a frame loss ratio) by at least comparing the number of frames sent to network element 16F to the number of frames received from network element 16F. Network element 16A may also determine a link delay between at time at which network element 16A sent each frame and a time at which network element 16A received the corresponding reflected frame back from network element 16F. Either or both of the frame loss ratio and the link delay measurement may be compared to a respective threshold value. The respective threshold values may correspond to a particular service level (i.e., performance level) desired for the transmission of frames between network elements 16A and 16F.

If either the frame loss ratio or the determined amount of link delay exceeds the corresponding threshold, network element 16A may generate a message (i.e., a threshold notification). In some examples, network element 16A may send the message to element management system 10. The message may include an indication of which performance metric (i.e., the frame loss ratio or the link delay) exceeded the corresponding threshold.

Network 16A continues to send synthetic traffic to network element 16F and continues to monitor the performance of the metro Ethernet network between the two network elements. At some time after the performance of the network initially exceeds the performance metric threshold, network element 16A may determine that the performance of the network is now below the threshold (e.g., that the frame loss ration is below the maximum desired frame loss ratio, that the link delay is below the maximum desired link delay, etc.) and, in response, may send a message to element management system 10 indicating that the performance metric is now below the threshold.

In some examples, network element 16A may utilize Simple Network Management Protocol (SNMP) to exchange threshold notifications with element management system 10. In these examples, network element 16A may include an SNMP agent and element management system 10 may include an SNMP manager. The SNMP agent of network element 16A may generate a SET trap in response to determining that the threshold is exceeded and send it to the SNMP manager of element management system 10. Similarly, the SNMP agent of network element 16A and may generate a CLEAR trap in response to determining that the value of the particular performance metric has dropped below the corresponding threshold and send it to the SNMP manager of element management system 10. However in instances where the threshold value is crossed and cleared multiple times, the SNMP agent would need to generate and send multiple SET/CLEAR traps, which can overwhelm the SNMP agent and the SNMP manager. Typically, the SNMP agent may be configured to wait a certain amount of time (e.g., between 0 and 60 seconds) between generating another trap of the same type. However, this may result in element management system 10 receiving information about only a subset of the threshold flapping events, which may provide an incomplete picture of the current status and performance of network 2.

In accordance with techniques of this disclosure, the SNMP agent of network element 16A may be configured to analyze the threshold flapping (i.e., the threshold cross/clear conditions) that occur during a configurable duration of time (e.g., between 1 and 600 seconds, between 1 and 10,000 seconds, between 1 and 36,000 seconds, etc.). The number of threshold flaps that occur during the duration of time may be referred to herein as the "flap frequency." For example, in response to network element 16A determining that a performance threshold has been crossed (i.e., that the performance of network 2 does not satisfy the performance metric), network element 16A may initialize a timer for a configurable duration of time and perform enhanced network performance monitoring for the configurable duration of time. That is, when performing enhanced network performance monitoring, the SNMP agent of network element 16A does not generate threshold notifications each time the performance metrics traverses the threshold value. Instead, network element 16A tracks each instance of the threshold flap (i.e., a combination of SET and CLEAR) for the particular performance monitoring session. Responsive to determining that the timer has expired (i.e., that the configurable duration has elapsed), the SNMP agent of network element 16A may generate a FLAP trap that includes at least a number of times the threshold flapped during the configurable duration, but may also include an indication of the number of seconds in the configurable duration and the current trap state (i.e., SET or CLEAR) at the end of the configurable duration, the configured threshold value, the current value of the performance metric, and the object identifier of the object that caused the generation of the threshold notification (i.e., frame loss or link delay). If the flap frequency is zero, the SNMP agent of network element 16A may refrain from generating a FLAP trap.

In this manner, techniques of this disclosure may provide an administrator of network 2 better visibility about the condition and stability of the network and may further aid in isolating and debugging problems with network 2. Further, by performing the monitoring on a per session and per MEP basis, the administrator of network 2 may have flexibility to prioritize threshold flapping monitoring for certain performance monitoring sessions over other performance monitoring sessions by configuring aggressive flap monitor timers for these sessions.

Figure 2:
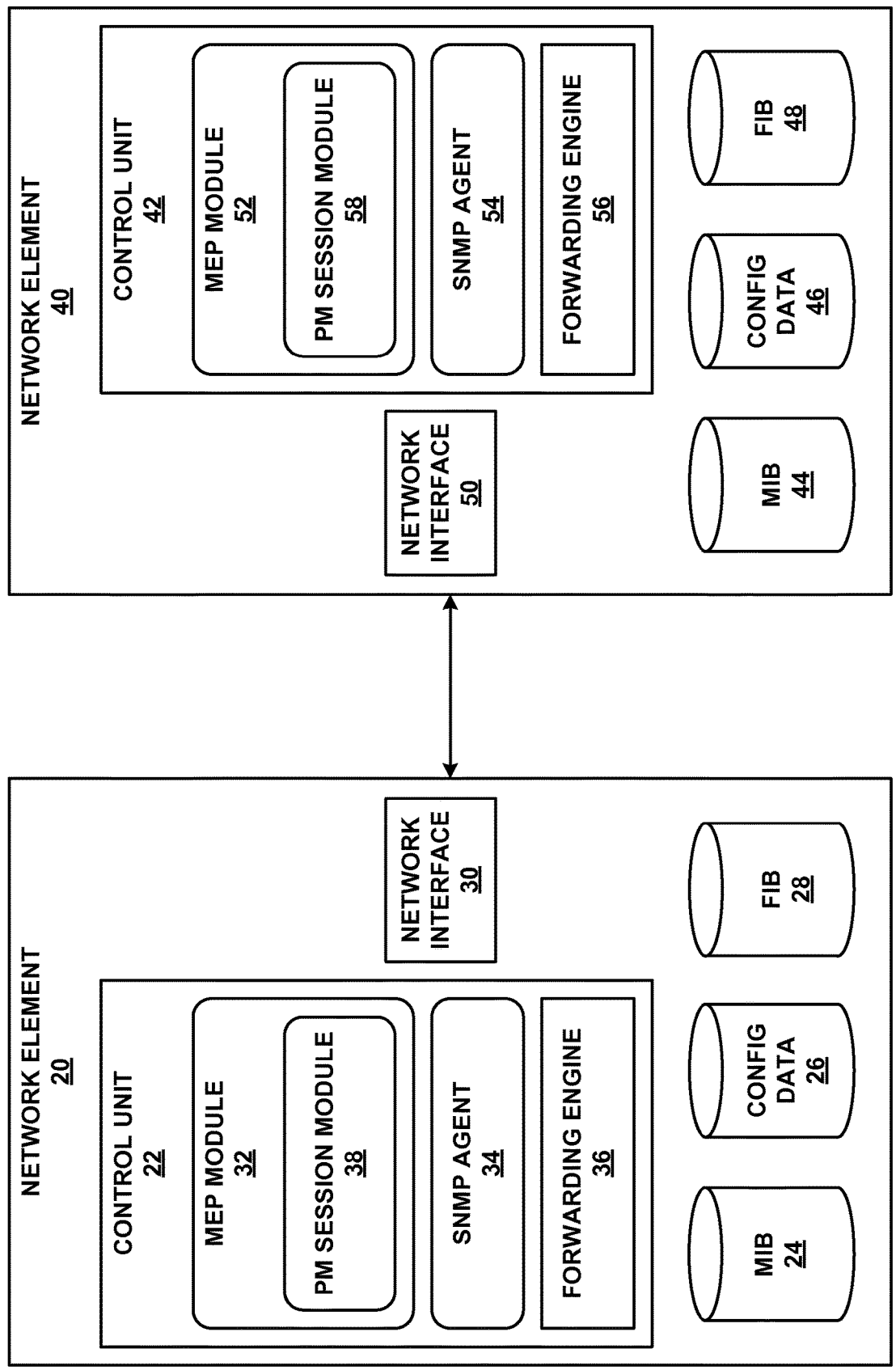
FIG. 2 is a block diagram illustrating an example set of network elements configured to engage in Service OAM Performance Monitoring, in accordance with one or more aspects of this disclosure.

FIG. 2 is a block diagram illustrating an example set of network elements configured to engage in Service OAM Performance Monitoring, in accordance with one or more aspects of this disclosure. Network elements 20, 40 may communication using a management protocol, such as OAM, for exchanging performance monitoring messages over a communication link. Each of network elements 20, 40 may be an example of network elements 16 of FIG. 1.

In the example illustrated in FIG. 2, network element 20 includes control unit 22, MIB 24, configuration ("CONFIG") data 26, and network interface 28. Control unit 22 may include one or more processors that execute software instructions, such as those used to define a software or computer program, stored to a computer-readable storage medium. Examples of computer-readable storage media include a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control unit 22 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 22 provides an operating environment for MEP module 32, SNMP agent 34, and forwarding engine 36. Control unit 22 also provides a repository for management information base ("MIB") 24, configuration data ("CONFIG DATA") 26, and forwarding information base ("FIB") 28. Each of MIB 24, CONFIG DATA 26, and FIB 28 may be stored in a data repository and may store objects in the form of one or more tables, databases, linked lists, radix trees, or other suitable data structure.

In general, forwarding engine 36 inspects received packets to determine the destination of the packet, e.g., based on header information of the packet that includes the address of the destination. Forwarding engine 36 performs a lookup within FIB 28 based on the packet's header information to determine wherein to direct the packet.

Network element 20 stores objects that represent network element 20 resources in a structured form within MIB 24. Each object is identifiable by a unique object identifier. The specific characteristics, or "managed objects," of network element 20 typically include resources, parameters, settings, or descriptors for a component, software objects' attributes, system attributes, or global data, for instance. Examples of managed objects include network interfaces of network element 20, data describing the relationships between multiple sub-layers of network interfaces, and data describing and providing status information for IEEE 802.3 Medium Attachment Units (MAUs).

SNMP agent 34 may operate as a software daemon executing within control unit 22. A network operator or other administrator may interact with network element 20 via an administrator interface to direct SNMP agent 34 to manage network element 20 in a specified manner, e.g., to modify the configuration of network element 20 or to monitor the status or performance of network element 20, by requesting variable information available from network element 20 according to MIB 24. For example, the operator may enter commands to view and modify CONFIG data 26 and ultimately to deploy the configuration data to MIB 24 of network element 20 as operational configuration data of the device. As another example, the operator may enter commands to retrieve the operational data from MIB 24 of network element 20.

MEP module 32 provides functionality to enable network element 20 to operate as a management endpoint, e.g., in accordance with the 802.1ag standard. More generally, MEP module 32 is an instance of one or more OAM protocols executing within control unit 22. In some examples, MEP module 32 includes performance monitoring ("PM") session module 28. PM session module 28 may monitor the performance of a network between network element 20 and a different network element (e.g., network element 40).

Network element 40 includes control unit 42, MIB 44, configuration ("CONFIG") data 46, FIB 48, and network interface 50. Although illustrated in FIG. 2 as including the same components as network element 20, each of network elements 20, 40 may include additional, fewer, or other components and may not include the same components as the other network element. For purposes of the example described with respect to FIG. 2, each of control unit 42, MIB 44, configuration ("CONFIG") data 46, FIB 48, network interface 50, MEP module 52, SNMP agent 54, forwarding engine 56, and PM session module 58 provide similar basic functionality as control unit 22, MIB 24, CONFIG data 26, FIB 28, network interface 30, MEP module 32, SNMP agent 34, forwarding engine 36, and PM session module 38 as well as as described with respect to network element 20.

Network element 20 may initiate a performance monitoring session to monitor the performance of a network in which network element 20 resides. When initiating the performance monitoring session, PM session module 38 may initiate a new session using configuration information (e.g., from CONFIG data 26). The configuration information may specify a number of messages (e.g., frames, protocol data units (PDUs), packets, etc.) that are to be sent during the particular session as well as one or more other network elements (e.g., network element 40) to which exchange messages during the performance monitoring session.

PM session module 38 may establish the performance monitoring session with network element 40. PM session module 38 may generate one or more frames (i.e., synthetic frames) for sending, via network interface 30, to network element 40 in order to monitor the performance of the network between network element 20 and network element 40. Typically, a performance monitoring session is configured to measure the performance of the network over a particular time period (e.g., 10 seconds, 1 minute, 10 minutes, etc.). While the performance monitoring session is active, PM session module 38 causes network element 20 to periodically send, via network interface 30, the synthetic network traffic (e.g., Ethernet frames) to network element 40 and analyzes any responses to the synthetic network traffic received, via network interface 30, from network element 40. In general, PM module 38 determines whether or not the performance of the network satisfies a performance metric based on the analysis of the frames received from network element 40. The particular exchange of frames and the analysis of the frames performed by PM session module 38 is described in more detail with respect to FIG. 3.

In determining whether or not the performance of the network satisfies a performance metric, PM session module 38 determines a number of lost frames and/or a link delay in the network. PM session module 38 may determine the link delay based on an amount of time that elapsed from when network element 20 sent a particular frame to when network element 20 received a response to the particular frame. The performance metric may include a threshold value for a particular level of service guaranteed by a network service provider. The threshold may correspond to a maximum number of dropped frames or a maximum link delay in the network permitted for the particular level of service and may be a configurable value (e.g., by an administrator of the network). PM session module 38 may analyze a portion of the frames (e.g., a sliding window of frames) sent during the performance monitoring session to determine whether or not the performance of the network during the analyzed time period satisfies the performance metric (e.g., the number of dropped frames is below the threshold number of dropped frames and/or the link delay is less than the threshold amount of link delay). The sliding window of received frames may be configurable and may include any frames received within a particular period of time, a particular number of received frames, and/or any frames received in response to a particular set of frames sent by network element 20.

In instances where PM session module 38 determines that the performance of the network does not satisfy the performance metric, PM session module 38 may cause SNMP agent 34 to generate an alarm notification. In some examples, the alarm notification may be an SNMP trap. That is, in response to determining that the performance of the network does not satisfy the performance metric, SNMP agent 34 may generate a SET trap and network element 20 may send the SET trap PDU to an element management system (e.g., element management system 10 of FIG. 1). In some examples, in response to determining that the performance of the network does not satisfy the performance metric, SNMP agent 34 may perform enhanced network performance monitoring. Enhanced network performance monitoring includes initiating a timer and counting the number of times the performance of the network transitions between not satisfying the performance metric and satisfying the performance metric during the time period between when the timer is initiated and when the timer expires.

In one example, after initiating the timer (i.e., after determining that the performance of the network does not satisfy the performance metric and as part of initiating the enhanced network performance monitoring), PM session module 38 analyzes another set of frames received from network element 40. PM session module 38 may determine that the performance of the network now satisfies the performance metric (e.g., the number of dropped frames in the set of frames is below the threshold value and/or the link delay as determined based on the set of frames is below the threshold). Responsive to determining that the performance of the network now satisfies the performance metric, PM session module 38 may cause SNMP agent 34 to generate a CLEAR trap. In some examples, network element 20 may send the CLEAR trap to an element management system (e.g., element management system 10 of FIG. 1). When the performance of the network does not satisfy the performance metric and then, during the same performance monitoring session, later satisfies the performance metric, this is called a network performance "flap." That is, the performance of the network is "flapping" between satisfying the performance metric and not satisfying the performance metric.

Responsive to determining that the performance of the network now satisfies the performance metric, PM session module 38 may increment a counter that corresponds to the number of network performance "flaps" that occur while PM session module 38 is performance enhanced network performance monitoring. Each time the performance of the network subsequently does not satisfy the performance metric and then satisfies the performance metric, the counter is incremented by one. That is, each pair of SET and CLEAR traps generated by SNMP agent 34 corresponds to a single "flap" of the network performance. In some examples, network element 20 may be configured to send each SET trap and each CLEAR trap to the element management system. In other examples, network element 20 may be configured to refrain from sending the SET and CLEAR traps while PM session module 38 is performing the enhanced network performance monitoring.

PM session module 38 continues to perform enhanced network performance monitoring—including counting the number of network performance "flaps"—until the timer expires. After the timer expires, PM session module 38 determines how many times the performance of the network "flapped" while PM session module 38 was performing enhanced performance monitoring. If the number of flaps is zero (i.e., the performance of the network failed to satisfy the performance metric and failed to satisfy the performance metric prior to the expiration of the timer), PM session module 38 may simply continue the performance monitoring session until the performance of the network once again fails to satisfy the performance metric. If the number of flaps is greater than zero (i.e., the performance of the network satisfied the performance metric at least once prior to the expiration of the timer), PM session module 38 causes SNMP agent 34 to generate a FLAP trap and send, via network interface 30, the FLAP trap to an element management system.

The FLAP trap is one example of an SNMP trap that may be used to send information about the network performance flapping to an element management system. Any SNMP trap, conventional SNMP message, Ethernet frame, or other type of network message may be used to send the information to the element management system. The FLAP trap may include one or more of the number of times the performance of the network flapped while PM session module 38 was performing enhanced network performance monitoring, the total number of flaps that occurring for the entire performance monitoring session, the number of PDUs remaining to be sent during the current performance monitoring session, the state of the trap (i.e., SET or CLEAR) at the time the timer expired, the configured performance metric threshold value(s), the current value of the performance metric (e.g., the most recently determined value for the number of dropped frames and/or the link delay), or the object identifier that caused the generation of the alarm notification (i.e., the object identifier that had the value that did not satisfy the performance metric).

In various instances, after sending the FLAP trap to the element management system, network element 20 may receive, via network interface 30, updated configuration information from the element management system. For example, an administrator may analyze the information included in the FLAP trap and may make changes to the network configuration based on the information included in the FLAP trap. Responsive to receiving the updated network configuration information (e.g., via SNMP), network element 20 updates is network configuration.

While described with respect to network element 20 monitoring the performance of the network between network element 20 and network element 40, network element 20 may be similarly configured to monitor the performance between network element 20 and any other network element. Further, network element 40 may be configured to monitor the performance between network element 20 or any other network element.

Figure 3:
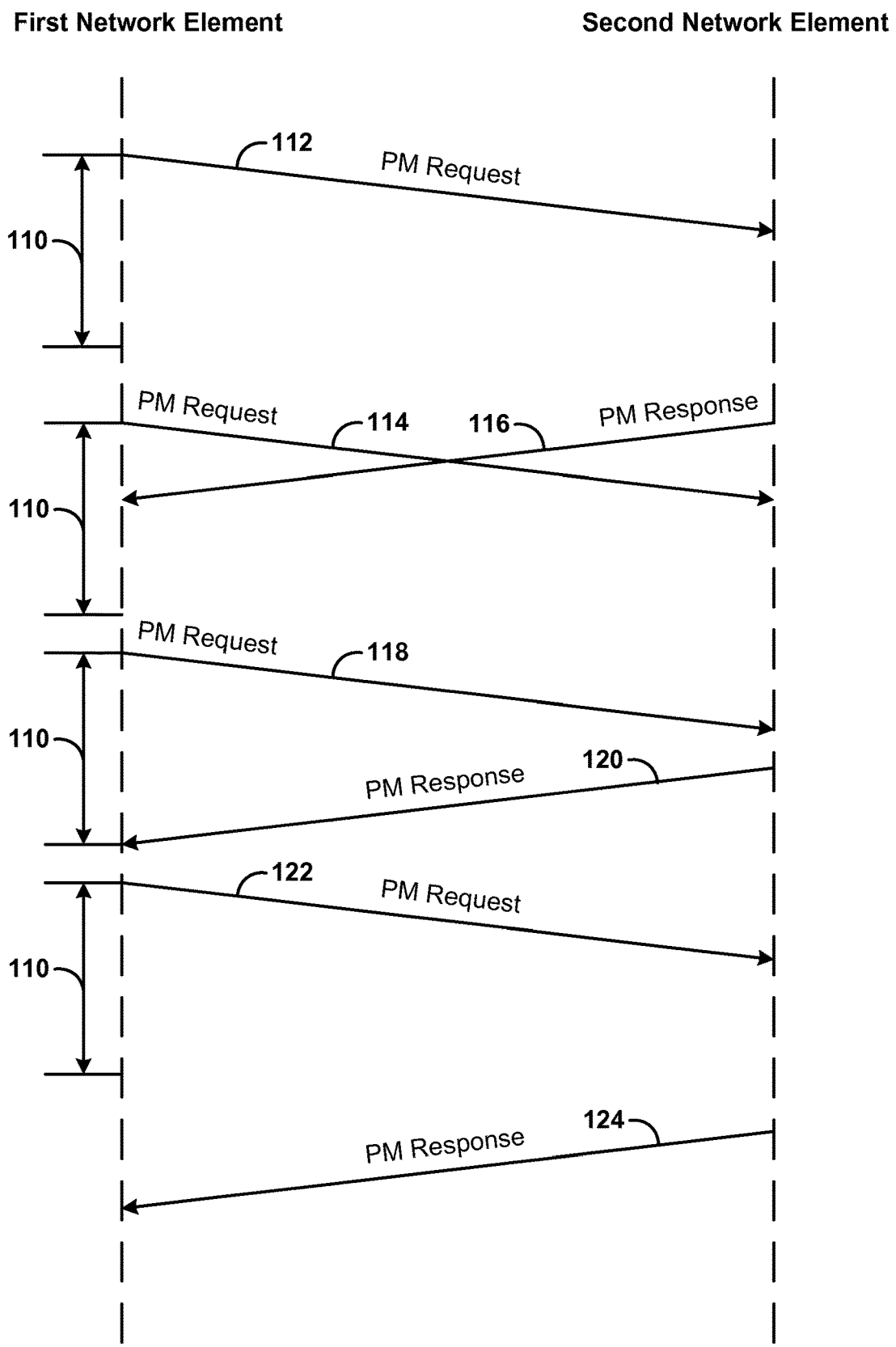
FIG. 3 is a conceptual diagram illustrating an example message exchange that includes threshold flapping, in accordance with one or more aspects of this disclosure.

FIG. 3 is a conceptual diagram illustrating an example message exchange that includes threshold flapping, in accordance with one or more aspects of this disclosure. For purposes of clarity, the example message exchange shown in FIG. 3 will be described with respect to network elements 20 and 40 shown in FIG. 2. The "First Network Element" of FIG. 3 is described as corresponding to network element 20 of FIG. 2 and the "Second Network Element" is described as corresponding to network element 40 of FIG. 2. The message exchange illustrated in FIG. 3 is one example of a message exchange that may occur during a performance monitoring session.

In the example message exchange shown in FIG. 3, network element 20 is configured with two performance metrics: a link delay that corresponds to time span 110 and a dropped frame rate. As described above with respect to FIG. 2, PM session module 38 initiates a performance monitoring session and periodically sends, via network interface 30, performance monitoring (PM) requests to network element 40. In general, PM requests may be any message, such as an Ethernet frame, packet, etc. usable to cause network element 40 to send a response to the message.

As shown in FIG. 3, at a first time, PM session module 38 sends PM request 112 to network element 40. At a second time, later than the first time and before network element receives a response to PM request 112, PM session module 38 sends PM request 114 to network element 40. Network element 40 receives PM request 112 and sends PM response 116. As network element 20 fails to receive PM response 116 within time span 110 associated with PM request 112, PM session module 38 determines that the link delay associated with PM request 112 does not satisfy the performance metric and causes SNMP agent 34 to generate a SET trap. PM session module 38 may also initiate enhanced network performance monitoring as described above with respect to FIG. 2.

With respect to PM request 114, PM session module 38 determines that network element 20 does not receive a corresponding response. PM session module 38 may determine that, based on the lack of response to PM request 114, that the dropped frame rate does not satisfy the performance metric. In some examples, as the performance of the network already fails to satisfy the performance metric, SNMP agent 34 may not generate an additional SET trap. In other examples, PM session module 38 may maintain separate performance metric information for each different network performance measurement (i.e., one for link delay and a separate one for dropped frame rate). In these other examples, SNMP agent 34 generates a SET trap for the dropped frame rate performance metric even through a SET trap was previously generated for the link delay performance metric.

Network element 20 sends PM request 118 to network element 40 and receives PM response 120 from network element 40 within time span 110. PM session module 38 may determine that, as PM response 120 was received and was received within time span 110, both the link delay and dropped frame rate performance metrics may be satisfied. Responsive to determining that the performance metrics are satisfied, PM session module 38 may cause SNMP agent 34 to generate a CLEAR trap. In examples where PM session module 38 maintains separate performance metric information for each different network performance measurement, PM session module 38 may cause SNMP agent 34 to generate two CLEAR traps—one for the link delay performance metric and one for the dropped frame rate performance metric. In some examples, PM session module 38 may not cause SNMP agent 34 to generate CLEAR traps in response to determining that the network performance satisfies the performance metric. In these examples, PM session module 38 may be configured to generate a FLAP trap at the end of the enhanced network performance monitoring (e.g., when the timer expires). In some examples, PM session module 38 may be configured to cause SNMP agent 34 to generate the CLEAR traps and to generate a FLAP trap at the end of the enhanced performance monitoring session. PM session module 38 may also increment the counter corresponding to the number of network performance flaps occurring while PM session module 38 is performing enhance network performance monitoring.

Network element 20 sends PM request 122 to network element 40 and receives PM response 124 outside of time span 110. PM session module 38 determines, based on PM response 124 being received outside of time span 110, that the performance of the network does not satisfy the performance metric and causes SNMP agent 34 to generate another SET trap.

While described as determining whether or not the performance of the network satisfies the various performance metrics on a per message basis, PM session module 38 may also determine whether or not the performance of the network satisfies the performance metrics based on a sliding window of messages. For example, the message exchange illustrated in FIG. 3 may correspond to a single window of messages that is analyzed by PM session module 38. PM session module may determine that, during this window, network element 20 sent four PM request messages, received three PM responses, including to PM responses that were outside of time span 110. Based on this window of message, PM session module 38 may determine that only receiving one PM response within time span 110 does not satisfy the link delay performance metric and that receiving PM responses to three of the four PM requests sent does satisfy the dropped frame rate performance metric.

Figure 4:
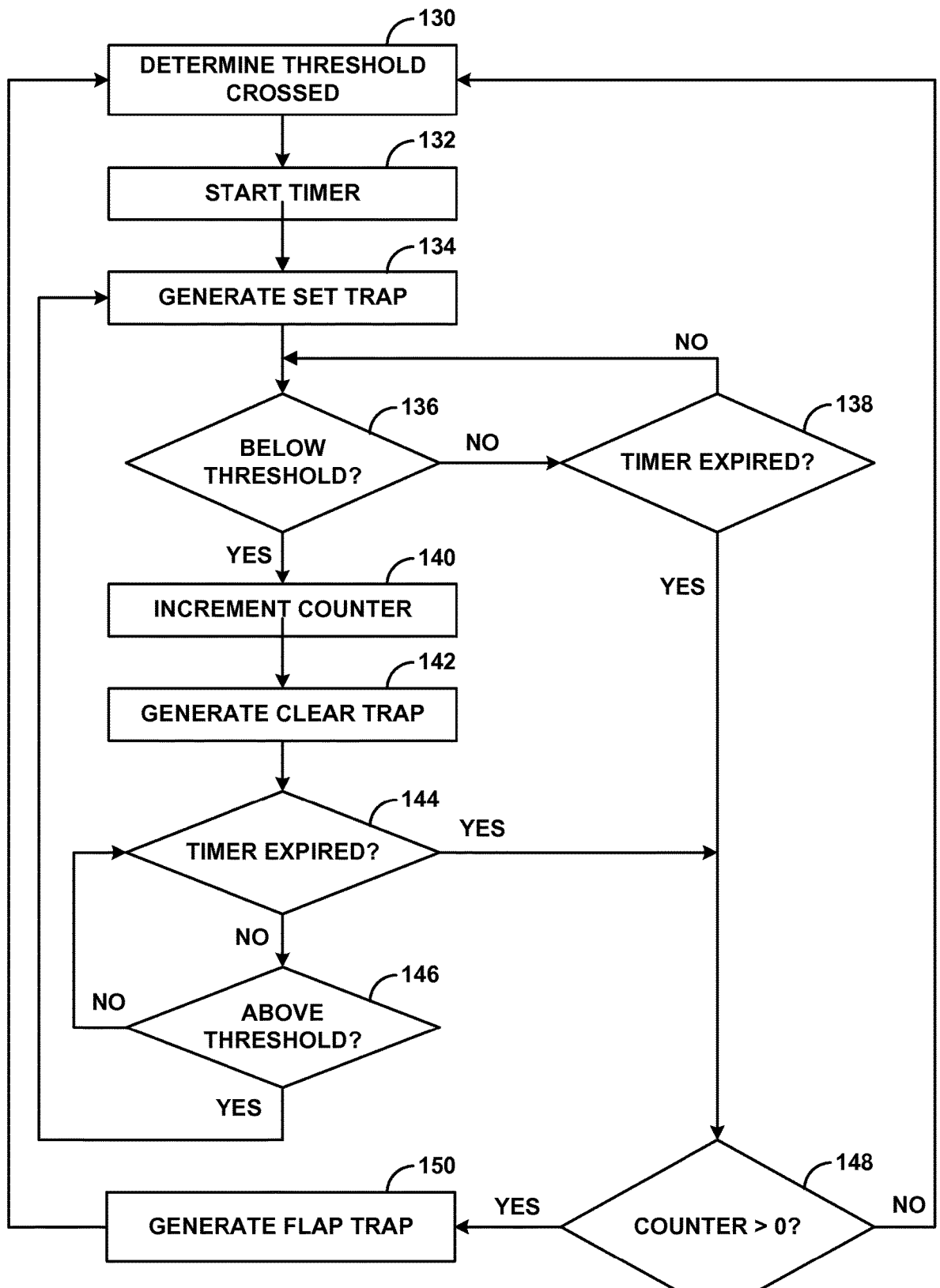
FIG. 4 is a flowchart illustrating an example process for monitoring threshold flapping, in accordance with one or more aspects of this disclosure.

FIG. 4 is a flowchart illustrating an example process for monitoring threshold flapping, in accordance with one or more aspects of this disclosure. For purposes of clarity, the process shown in FIG. 4 will be described with respect to element management system 10 and network 2 of FIG. 1 and network elements 20, 40 of FIG. 2. In some examples, one or more steps of the process of FIG. 4 may be optional and the steps of the process may be performed in a different order.

PM session module 38 of network element 20 initiates a performance monitoring session and determines, based on one or more responses to performance monitoring requests, that the performance of network 2 crosses a performance metric threshold (130). The performance metric threshold may correspond to a dropped frame rate (i.e., a number of responses received relative to the number of requests sent) and/or a link delay (i.e., an amount of time that elapsed between when a request was send by network element 20 to when a response is received from network element 40). Responsive to determining that the network performance threshold is crossed (130), PM session module 38 starts enhanced network performance monitoring by at least starting a timer (132). In some examples, PM session module 38 may also cause SNMP agent 34 to generate a SET trap (134).

While PM session module 38 is performing enhanced network performance monitoring, PM session module 38 continues to monitor the performance of the network to determine if the performance of the network falls below the performance metric threshold (136). That is, PM session module 38 determines whether the performance of the network satisfies the performance metric. Responsive to determining that the performance of the network is still above the performance metric threshold (i.e., does not satisfy the performance metric) ("NO" branch of 136), PM session module 38 determines whether the timer has expired (138). If the timer has expired ("YES" branch of 138), PM session module determines whether the flap counter is greater than zero (148). If the counter is not greater than zero ("NO" branch of 148), PM session module ceases performing enhanced performance monitoring and continues the performance monitoring session until the performance monitoring session is complete. If the timer has not expired ("NO" branch of 138), PM session module 38 continues performing the enhanced network performance monitoring.

Responsive to determining that the performance of the network is below the performance metric threshold (i.e., satisfies the performance metric) ("YES" branch of 136), PM session module 38 increments the network performance flap counter (140) and may cause SNMP agent 34 to generate a CLEAR trap (142). PM session module 38 determines whether the timer has expired (144) and, if the timer has expired ("YES" branch of 144), PM session module 38 determines whether the counter is greater than zero (148). In this example, as PM session module 38 incremented the counter, the counter is greater than zero ("YES" branch of 148). PM session module then causes SNMP agent 34 to generate a FLAP trap (150) and sends the FLAP trap to an element management system.

If the timer has not expired ("NO" branch of 144), PM session module 38 continues performing the enhanced network performance monitoring and determines whether the performance of the network is above the performance metric threshold (i.e., does not satisfy the performance metric) (146). If the performance of the network is not above the performance metric threshold ("NO" branch of 146), PM session module 38 determines whether the time has expired (144) and continues as described above. If the performance of the network is above the threshold ("YES" branch of 146), PM session module 38 generates a SET trap (134) and continues performing the enhanced network performance monitoring.

PM session module 38 determines whether the performance of the network is below the threshold (136) and, if not ("NO" branch of 136), determines whether timer has expired (138). In instances where the timer has expired ("YES" branch of 138), PM session module 38 ceases performing the enhanced network performance monitoring and determines whether the counter is greater than zero (148). If the counter is greater than zero ("YES" branch of 148), PM session module 38 causes SNMP agent 34 to generate a FLAP trap (150) for sending to the element management system. The FLAP trap includes at least an indication of the number of times the performance of the network transitioned between not satisfying the performance metric and satisfying the performance metric prior while PM session module 38 was performing the enhanced network performance monitoring. If the performance monitoring session is still active, PM session module 38 may continue to monitor the performance of network 2 and may determine that the performance of network 2 crosses the performance threshold (130). In general, this process may repeat while the performance monitoring session is active.

Figure 5:
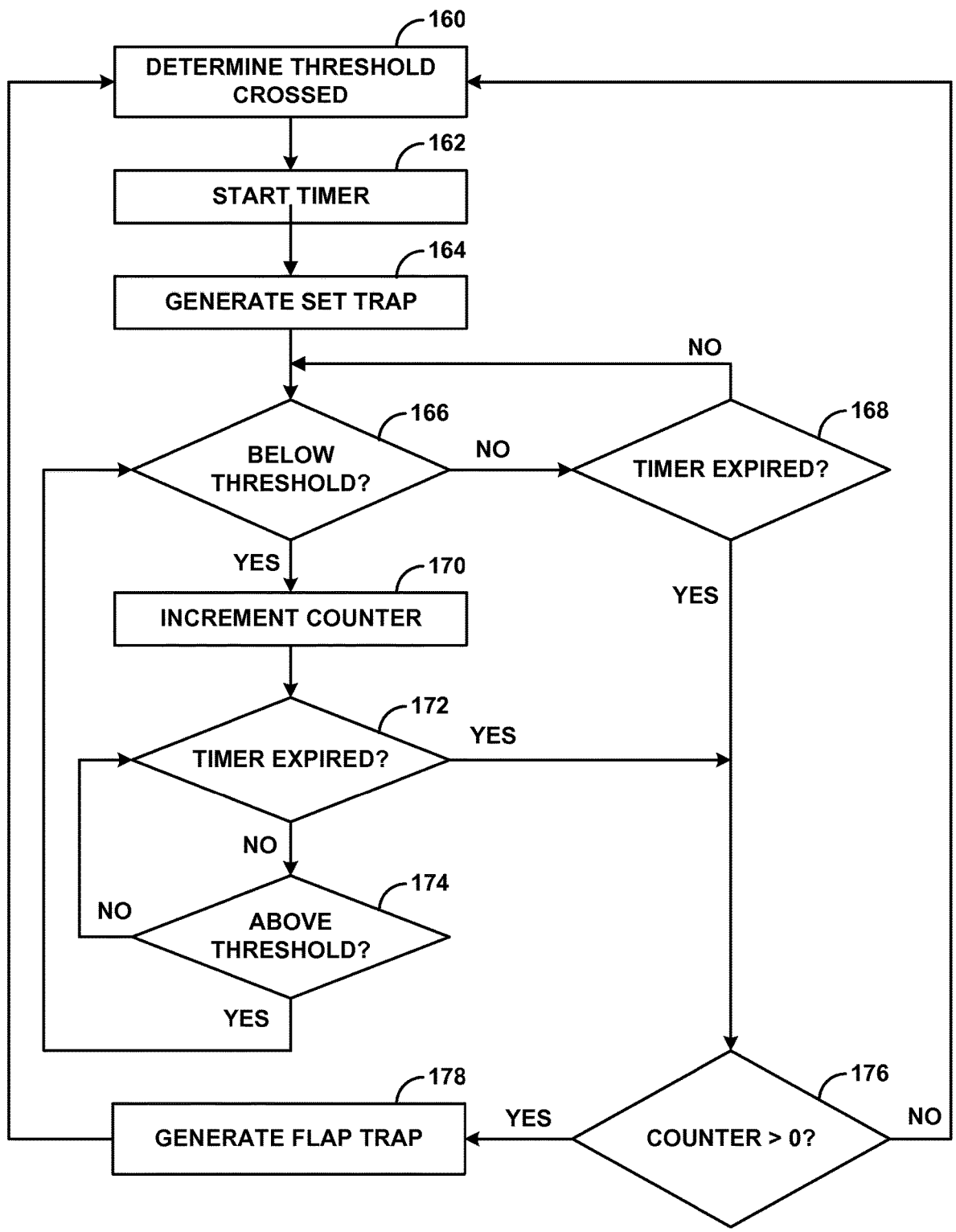
FIG. 5 is a flowchart illustrating another example process for monitoring threshold flapping, in accordance with one or more aspects of this disclosure.

FIG. 5 is a flowchart illustrating another example process for monitoring threshold flapping, in accordance with one or more aspects of this disclosure. For purposes of clarity, the process shown in FIG. 5 will be described with respect to element management system 10 and network 2 of FIG. 1 and network elements 20, 40 of FIG. 2. In some examples, one or more steps of the process of FIG. 5 may be optional and the steps of the process may be performed in a different order.

PM session module 38 of network element 20 initiates a performance monitoring session and determines, based on one or more responses to performance monitoring requests, that the performance of network 2 crosses a performance metric threshold (160). The performance metric threshold may correspond to a dropped frame rate (i.e., a number of responses received relative to the number of requests sent) and/or a link delay (i.e., an amount of time that elapsed between when a request was send by network element 20 to when a response is received from network element 40). Responsive to determining that the network performance threshold is crossed (160), PM session module 38 starts enhanced network performance monitoring by at least starting a timer (162). In some examples, PM session module 38 may also cause SNMP agent 34 to generate a SET trap (164).

While PM session module 38 is performing enhanced network performance monitoring, PM session module 38 continues to monitor the performance of the network to determine if the performance of the network falls below the performance metric threshold (166). That is, PM session module 38 determines whether the performance of the network satisfies the performance metric. Responsive to determining that the performance of the network is still above the performance metric threshold (i.e., does not satisfy the performance metric) ("NO" branch of 166), PM session module 38 determines whether the timer has expired (168). If the timer has expired ("YES" branch of 168), PM session module determines whether the flap counter is greater than zero (176). If the counter is not greater than zero ("NO" branch of 176), PM session module ceases performing enhanced performance monitoring and continues the performance monitoring session until the performance monitoring session is complete. If the timer has not expired ("NO" branch of 168), PM session module 38 continues performing the enhanced network performance monitoring.

Responsive to determining that the performance of the network is below the performance metric threshold (i.e., satisfies the performance metric) ("YES" branch of 166), PM session module 38 increments the network performance flap counter (170). PM session module 38 determines whether the timer has expired (172) and, if the timer has expired ("YES" branch of 172), PM session module 38 determines whether the counter is greater than zero (176). In this example, as PM session module 38 incremented the counter, the counter is greater than zero ("YES" branch of 176). PM session module then causes SNMP agent 34 to generate a FLAP trap (178) and sends the FLAP trap to an element management system.

If the timer has not expired ("NO" branch of 172), PM session module 38 continues performing the enhanced network performance monitoring and determines whether the performance of the network is above the performance metric threshold (i.e., does not satisfy the performance metric) (174). If the performance of the network is not above the performance metric threshold ("NO" branch of 174), PM session module 38 determines whether the time has expired (172) and continues as described above. If the performance of the network is above the threshold ("YES" branch of 174), PM session module 38 continues performing the enhanced network performance monitoring.

PM session module 38 determines whether the performance of the network is below the threshold (166) and, if not ("NO" branch of 166), determines whether timer has expired (168). In instances where the timer has expired ("YES" branch of 168), PM session module 38 ceases performing the enhanced network performance monitoring and determines whether the counter is greater than zero (176). If the counter is greater than zero ("YES" branch of 176), PM session module 38 causes SNMP agent 34 to generate a FLAP trap (178) for sending to the element management system. The FLAP trap includes at least an indication of the number of times the performance of the network transitioned between not satisfying the performance metric and satisfying the performance metric prior while PM session module 38 was performing the enhanced network performance monitoring. If the performance monitoring session is still active, PM session module 38 may continue to monitor the performance of network 2 and may determine that the performance of network 2 crosses the performance threshold (160). In general, this process may repeat while the performance monitoring session is active.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage medium" refers to physical storage media, (i.e., non-transitory media) and not signals, carrier waves, or other transient media.

Various embodiments have been described. These and other embodiments are within the scope of the following claims.

What is claimed is:

1. A method comprising:
   monitoring, by a first network device, performance of a network between the first network device and a second network device;
   responsive to determining, by the first network device, that the performance of the network does not satisfy a performance metric, performing, by the first network device and for a duration of time, enhanced network performance monitoring, wherein the performance metric is one or more of a frame loss ratio performance metric or a link delay performance metric, and wherein performing the enhanced network performance monitoring for the duration of time comprises determining, with the first network device, a number of times the performance of the network transitions between not satisfying the performance metric and satisfying the performance metric during the duration of time;
   while performing the enhanced network performance monitoring, refraining from transmitting, from the first network device, to an element management system, and during the time duration, information about each time the performance of the network transitions between not satisfying the performance metric to satisfying the performance metric during the duration of time; and
   after the duration of time has elapsed, transmitting, from the first network device and to the element management system, information about the performance of the network, the information including at least the number of times the performance of the network transitioned between not satisfying the performance metric and satisfying the performance metric during the duration of time.

2. The method of claim 1, wherein the performance metric is the link delay performance metric, and wherein the enhanced network performance monitoring further comprises:
   transmitting, from the first network device and to the second network device using the network, at least one message;
   receiving, with the first network device and from the second network device using the network, a response to the at least one message;
   determining, based on a time at which the at least one message was transmitted to the second network device and a time at which the first network device received the response to the at least one message, an amount of link delay; and determining whether the amount of link delay satisfies the link delay performance metric.

3. The method of claim 2,
wherein the network comprises a metro Ethernet network,
wherein the first and second network devices comprise layer two switches, and
wherein the at least one message comprises at least one Ethernet frame.

4. The method of claim 1, wherein the performance metric is the frame loss ratio performance metric, and wherein the enhanced network performance monitoring further comprises:

transmitting, by the first network device and to the second network device using the network, a plurality of messages;

receiving, by the first network device and from the second network device, one or more response messages to at least a portion of the plurality of messages;

determining, based on a number of messages included in the plurality of messages transmitted to the second network device and a number of the one or more response messages received from the second network device; a frame loss ratio;

determining whether the frame loss ratio satisfies the frame loss ratio performance metric.

5. The method of claim 1,
wherein monitoring performance of the network between the first network device and the second network device comprises initiating a network performance monitoring session, wherein the network performance monitoring session specifies a number of messages to be sent to the second network device during the performance monitoring session, and
wherein the information transmitted to the element management system further includes a number of messages remaining to be sent during the performance monitoring session.

6. The method of claim 1, further comprising:
responsive to determining that the performance metric is not being satisfied:
generating, by the first network device, a first simple network management protocol (SNMP) trap that indicates that the performance of the network does not satisfy the performance metric; and
initiating, by the first network device, a timer to a value of the duration of time; and
prior to expiration of the timer:
each time the performance metric is satisfied, generating a second SNMP trap that indicates that the performance of the network satisfies the performance metric; and
each time the performance metric subsequently not satisfied, generating a third SNMP trap that indicates that the performance of the network does not satisfy the performance metric,
wherein the information transmitted to the element management system further includes an indication of a most recently generated SNMP trap.

7. The method of claim 1, further comprising:
responsive to transmitting the information to the element management system, receiving, by the first network device and from the element management system, updated network configuration information; and updating, by the first network device and based on the updated network configuration information, network configuration of the first network device.

8. The method of claim 1, wherein transmitting the information about the performance of the network is in response to determining that the number of times is greater than zero, the method further comprising:
responsive to determining that the number of times is zero, refraining from transmitting, from the first network device to the element management system, the information about the performance of the network.

9. The method of claim 1, wherein the information about the performance of the network further includes an indication a configured threshold value of the performance metric and a current value of the performance metric.

10. The method of claim 1, wherein the duration of time is a configurable time duration, and wherein the performance metric includes a configurable threshold value.

11. A network device comprising:
a network interface; and
a control unit that provides an execution environment for a network performance monitoring module, wherein the network performance monitoring module is operable by the control unit to:
monitor performance of a network between the network device and a different network device;
determine, based on the monitoring, that the performance does not satisfy a performance metric, wherein the performance metric is one or more of a frame loss ratio performance metric or a link delay performance metric;
responsive to the performance not satisfying the performance metric, perform enhanced network performance monitoring for a duration of time by at least determining a number of times the performance of the network transitions between not satisfying the performance metric and satisfying the performance metric during the duration of time; and
while performing the enhanced network performing monitory, refrain from transmitting, using the network interface, to an element management system, and during the time duration, information about each time the performance of the network transitions between not satisfying the performance metric to satisfying the performance metric during the duration of time,
wherein the network interface transmits, after the duration of time has elapsed and to the element management system, information about the performance of the network, the information including at least the number of times the performance of the network transitioned between not satisfying the performance metric and satisfying the performance metric during the duration of time.

12. The network device of claim 11,
wherein the performance metric is the link delay performance metric,
wherein the network interface transmits, to the different network device using the network, at least one message, and receives, from the different network device using the network, a response to the at least one message, and
wherein the network performance monitoring module is operable by the control unit to determine, based on a time at which the at least one message was transmitted to the second network device and a time at which the first network device received the response to the at least one message, an amount of link delay, and determine whether the amount of link delay satisfies the link delay performance metric.

13. The network device of claim 11,
wherein network performance monitoring module is operable by the control unit to initiate a network performance monitoring session with the different network device, wherein the network performance monitoring session specifies a number of messages to be sent to the different network device during the performance monitoring session, and
wherein the information transmitted to the element management system further includes a number of messages remaining to be sent during the performance monitoring session.

14. The network device of claim 11,
wherein the control unit further provides an execution environment for a simple network management protocol (SNMP) agent,
wherein the network management application is operable by the control unit to, responsive to determining that the performance metric not being satisfied, generate a first (SNMP) trap that indicates that the performance of the network does not satisfy the performance metric,
wherein the network performance monitoring module is operable by the control unit to:
  initiate a timer to a value of the duration of time; and
  prior to expiration of the timer:
    each time the performance metric is satisfied, cause the network management application to generate a second SNMP trap that indicates that the performance of the network satisfies the performance metric; and
    each time the performance metric subsequently not satisfied, cause the network management application to generate a third SNMP trap that indicates that the performance of the network does not satisfy the performance metric, and
  wherein the information transmitted to the element management system further includes an indication of a most recently generated SNMP trap.

15. A computer-readable storage medium encoded with instructions that cause one or more programmable processors of a first network device to:
  monitor performance of a network between the first network device and a second network device;
  responsive to determining that the performance of the network does not satisfy a performance metric, perform, for a duration of time, enhanced network performance monitoring, wherein the performance metric is one or more of a frame loss ratio performance metric or a link delay performance metric, and wherein performing the enhanced network performance monitoring for the duration of time comprises determining, with the first network device, a number of times the performance of the network transitions between not satisfying the performance metric and satisfying the performance metric during the duration of time;
  while performing the enhanced network performance monitoring, refrain from transmitting, from the first network device, to an element management system, and during the time duration, information about each time the performance of the network transitions between not satisfying the performance metric to satisfying the performance metric during the duration of time; and
  after the duration of time has elapsed, transmit, to the element management system, information about the performance of the network, the information including at least the number of times the performance of the network transitioned between not satisfying the performance metric and satisfying the performance metric during the duration of time.

16. The computer-readable storage medium of claim 15 wherein the performance metric is the link delay performance metric, and wherein the computer-readable storage medium is further encoded with instructions for causing the one or more processors to:
  transmit, to the second network device using the network, at least one message;
  receive, from the second network device using the network, a response to the at least one message;
  determine, based on a time at which the at least one message was transmitted to the second network device and a time at which the first network device received the response to the at least one message, an amount of link delay; and
  determine whether the amount of link delay satisfies the link delay performance metric.

17. The computer-readable storage medium of claim 15 further encoded with instructions for causing the one or more processors to:
  initiate a network performance monitoring session with the second network device, wherein the network performance monitoring session specifies a number of messages to be sent to the second network device during the performance monitoring session,
  wherein the information transmitted to the element management system further includes a number of messages remaining to be sent during the performance monitoring session.

18. The computer-readable storage medium of claim 15 further encoded with instructions for causing the one or more processors to:
  responsive to determining that the performance metric not being satisfied:
    generate a first simple network management protocol (SNMP) trap that indicates that the performance of the network does not satisfy the performance metric; and
    initiate a timer to a value of the duration of time;
  prior to expiration of the timer:
    each time the performance metric is satisfied, generate a second SNMP trap that indicates that the performance of the network satisfies the performance metric; and
    each time the performance metric subsequently not satisfied, generate a third SNMP trap that indicates that the performance of the network does not satisfy the performance metric,
  wherein the information transmitted to the element management system further includes an indication of a most recently generated SNMP trap.

* * * * *